Dec. 3, 1940.  D. EISINGA  2,223,359
THERMOSTATIC SWITCH AND SAFETY DEVICE
Filed Feb. 18, 1939
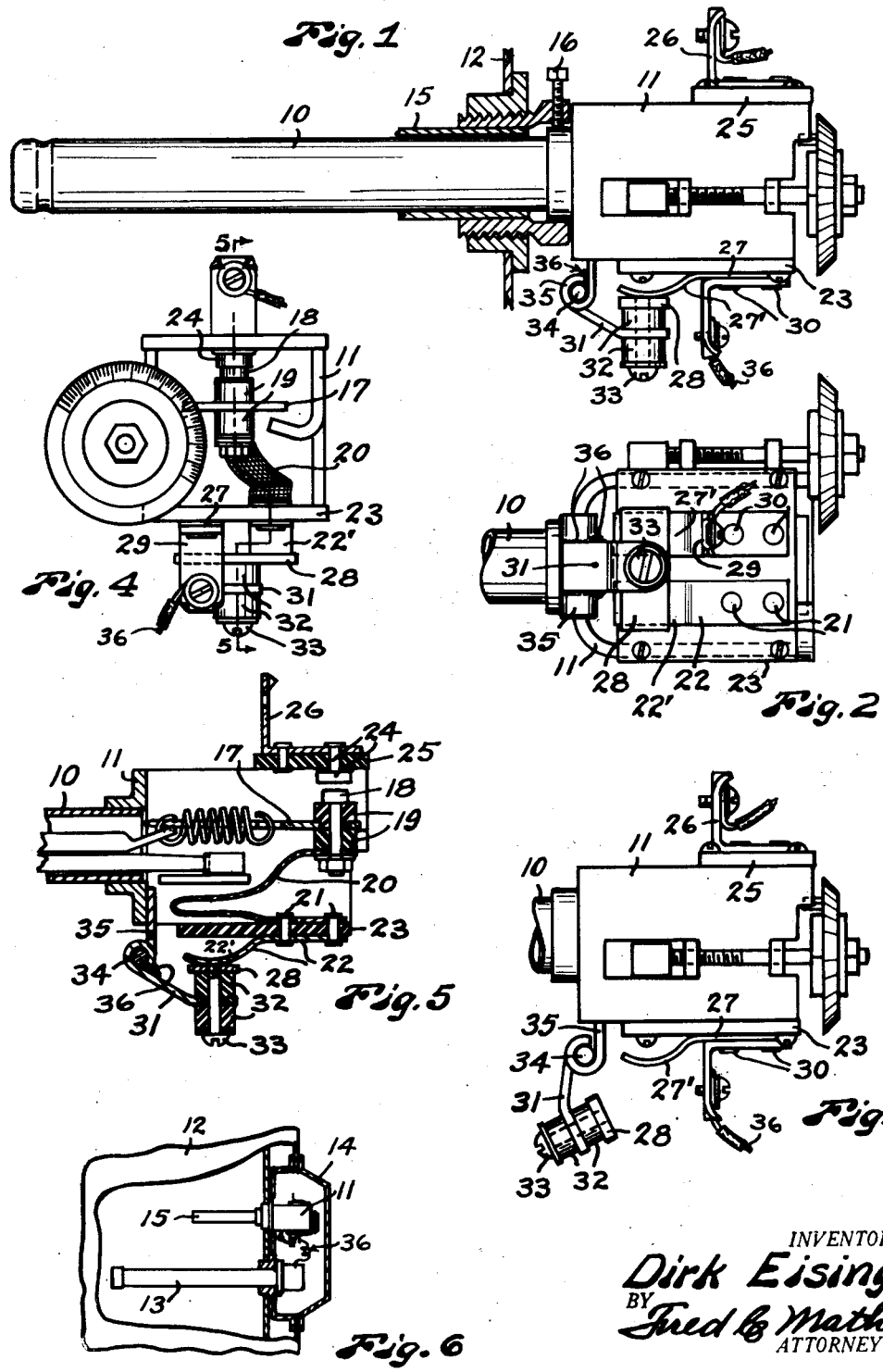
INVENTOR.
Dirk Eisinga
BY Fred C. Matheny
ATTORNEY Patented Dec. 3, 1940

2,223,359

UNITED STATES PATENT OFFICE 2,223,359

THERMOSTATIC SWITCH AND SAFETY DEVICE

Dirk Eisinga, Seattle, Wash., assignor to National Steel Construction Co., Seattle, Wash., a corporation of Washington Application February 18, 1939, Serial No. 257,112

3 Claims. (Cl. 200—137)

This invention relates to a combined thermostatic switch and safety device for use in connection with electric heating means for liquids and the present invention is in the nature of an improvement on the thermostatic switch disclosed in my prior patent application Serial No. 214,933, filed June 21, 1938.

An object of this invention is to provide a thermostatic switch for an electric fluid heater, which thermostatic switch has a heat operated safety switch or device connected in series therewith and adapted to be opened by reason of the melting of fusible metal in the event the thermostatic switch fails to operate properly and the temperature of fluid controlled thereby is in danger of exceeding the safety limit.

Another object of this invention is to provide a safety switch of novel and efficient construction which is adapted to be released by the melting or fusing of metal and to open by gravity after it has been released.

Another object is to provide a combined thermostatic switch and safety switch for use with electric liquid heating and storage means in which the fusing or melting of metal by which the safety switch is released is due entirely to the temperature of the liquid and the passage of electric current through the fusible metal is entirely avoided, it having been found that if electric current is passed through the fusible metal said metal will be heated thereby and the heating thus produced will vary in proportion to the wattage passed through the fusible metal.

Another object of this invention is to provide a simple and efficient thermostatic switch and safety switch which is especially well adapted for use in connection with electric water heating systems but which may be used to advantage in connection with the electric heating of other liquids or fluids or substances where the temperature of the substance being heated can be communicated directly to the switch.

Other objects are apparent in the description and drawing.

In the drawing, Fig. 1 is a side elevation of a thermostatic switch and safety device constructed in accordance with this invention.

Fig. 2 is a bottom plan view of the device with all parts in the same positions shown in Fig. 1.

Fig. 3 is a view similar to Fig. 1, showing the safety device in released position.

Fig. 4 is an end elevation of the device with all parts in the position shown in Fig. 1.

Fig. 5 is a fragmentary sectional view substantially on broken line 5—5 of Fig. 4, showing the thermostatic switch open.

Fig. 6 is a fragmentary small scale view illustrating an installation of this invention.

Like reference numerals designate like parts throughout the several views.

In the drawing 10 designates a tube and 11 a housing on the outer end of said tube. Within the tube 10 and housing 11 I provide thermostat mechanism which may be of the type disclosed in my prior patent application hereinbefore identified. This thermostat mechanism is responsive to variations in the temperature of water in a hot water tank 12, see Fig. 6, and controls the supply of current to an electric water heater 13. Preferably a housing 14 is provided on the exterior of the hot water tank 12, and preferably the thermostat tube 10 fits into a tube 15, which extends into the hot water tank 12. A set screw 16 may be used to hold the tube 10 in place within the tube 15. This arrangement insures ample metal to metal contact between the tube 15 and the thermostat parts so that the thermostat parts will always be maintained substantially at the temperature of the water in the hot water tank. It also permits quick and easy removal of the thermostat without draining the hot water tank.

Disposed within the housing 14, is a movable contact arm 17. The outer end portion of arm 17 carries a contact member 18 insulated from the arm 17 by insulating material 19. The lower end portion of contact member 18 is connected by a flexible conductor 20 and rivets 21 with a terminal member 22 on the outer side of a plate 23 of insulating material on the bottom of housing 11. The rivets 21 extend through the insulating plate 23. The upper end portion of the contact member 18 is movable into and out of electrical contact with a bolt 24. The bolt 24 extends through a plate 25 of insulating material on the top of the housing 11, and is connected with an L shaped terminal 26. When contact member 18 is in contact with bolt 24, as shown in Fig. 4, a circuit between terminals 22 and 26 will be closed. When contact member 18 is separated from bolt 24 this circuit will be broken. Thermostatic devices, which may be of the type disclosed in my prior application hereinbefore identified are provided for moving the arm 17 to open and close this circuit, depending on the temperature of the water in the tank 13.

In accordance with this invention I provide a combined heat and gravity operated safety or emergency device in series with the above described thermostatic switch, which safety device will break this circuit, before damage can occur, due to overheating of water in the tank, in the event the thermostatic switch should fail to function. This safety device comprises the terminal 22 and another similar terminal 27 secured to the insulating plate 23 in spaced relation to the terminal 22. The two terminals 22 and 27 are made of resilient metal and portions 22' and 27' respectively of said terminals are curved outwardly and stand clear of the insulating plate 23.

A switch bar 28 extends across the terminal portions 22' and 27' and electrically connects the same. An L shaped terminal member 29 is mechanically and electrically connected by rivets 30, with the terminal 27 and is electrically connected by conductor 36, Fig. 6, with the electric water heater 13. The switch bar 28 is secured to one end portion of a lever arm 31, by insulating means 32 and a screw 33. The insulating means 32 electrically insulates the switch bar 28 from the lever arm 31. The end portion of lever arm 31 remote from switch bar 28 is connected by a pivot member 34 with a bracket 35 which extends downwardly from the metal part of housing 11 and is welded or otherwise rigidly secured to said housing. The pivot 34 serves to hinge the lever arm 31 to the bracket 35. The bracket 35, being in close engagement with the metal housing 11, will be maintained at substantially the same temperature as the water in the hot water tank 12.

Before this device is put into use the hinge connection between bracket 35 and lever arm 31 is rendered rigid by soldering the same with fusible material or solder which will fuse or melt at a temperature below the boiling temperature of water. This fusible material is caused to flow into the space around pivot 34 and set so that it provides a rigid and non-yielding joint which will not yield unless it is subjected to heat above the melting temperature of the solder. At the time the pivotal connection between the arm 31 and bracket 35 is soldered the arm is positioned at such an angle as to cause the switch bar 28 to be pressed firmly against the resilient terminal portions 22' and 27'. One way of accomplishing this is to first assemble the device and then hold the switch bar 28 firmly in contact with the resilient terminal portions 22' and 27' while the pivotal connection between arm 31 and bracket 35 is being soldered and the solder allowed to set.

When the device is installed it is positioned so that the side of the housing to which the safety switch is secured is at the bottom. This positions the safety switch so that if the fusible metal is melted the weight of the switch bar 28 and lever arm 31 and insulation members 32 will insure that these parts will swing downwardly by gravity to break the circuit to the electric heater 13. It will be noted that the weight of the switch bar 28 will be acting through a leverage afforded by the arm 31 and that the force of the resilient terminals 22 and 27 will also be exerted to overcome any inertia or friction or tendency to stick in the pivot joint and this will insure that the arm 31 will swing downwardly as soon as the fusible metal has melted. The resiliency of terminals 22' and 27' also insures that efficient electrical contact will be maintained.

If current to an electric heater is passed through fusible metal in the circuit this current will heat the fusible metal and the amount of heating will vary with the amount of current so passed. This makes it necessary to provide a different fusible metal member for each different current to be transmitted and each of these fusible members have to be carefully worked out as to cross section and melting point, depending on the electrical load to be carried. My safety switch obviates this difficulty and make it possible to use the same safety switch for heaters of different capacity, as the current does not flow through the fusible metal at all.

While I have described and shown an adaptation of this device to a hot water tank it will be understood that the same may be used in connection with substantially any liquid or substance of like nature by suitably varying the fusing point of the solder.

The foregoing description and accompanying drawing clearly disclose a preferred embodiment of my invention but it will be understood that this disclosure is merely illustrative and that such changes may be made as are within the scope and spirit of the following claims.

I claim:

1. A heat controlled fusible safety switch comprising spaced apart terminals; a lever arm; a circuit closing means carried by one end portion of said lever arm normally electrically connecting said terminals; pivot means horizontally offset from said terminals supporting the other end portion of said lever arm and positioned so that gravity will tend to move said lever arm in a direction to separate said circuit closing means from said terminals; and fusible metal in and around said pivot means holding said pivot means immovable with said circuit closing means in contact with said terminals, said fusible metal being fusible at a predetermined temperature to free said pivot means and thereby provide for electrically disconnecting said terminals by gravity.

2. A thermostatic control and safety device for use in connection with a hot water tank and electric water heater therefor comprising a housing connected with the hot water tank and subject to changes of temperature of the water in said tank; thermostatic switch means in the housing controlling the circuit to the electric water heater; and a safety switch connected with said housing and subject to changes of temperature of the water in said tank, said safety switch comprising two spaced apart terminals interposed in the circuit of said electric water heater, a lever arm, circuit closing means carried by one end portion of said lever arm normally electrically connecting said terminals, pivot means horizontally offset from said terminals supporting the other end portion of said lever arm and positioned so that gravity will tend to move said lever arm in a direction to separate said circuit closing means from said terminals, and fusible metallic solder in said pivot means normally holding said arm relatively immovable with said circuit closing means in contact with said terminals, said metallic solder being fusible at a temperature below the boiling temperature of water to release said pivot means and electrically disconnect said terminals and break the circuit to said heater before the water in said tank begins to boil.

3. A thermostatic control and safety device for use in connection with a hot water tank and electric water heater therefor comprising a housing of heat conductive material connected with the hot water tank and subject to changes of temperature of the water in said tank; thermostatic switch means in the housing normally controlling the circuit to the electric water heater; a support of insulating material on the bottom portion of said housing; two spaced apart contact members secured to said insulating support and connected in the circuit of the electric water heater, said two contact members having resilient portions spaced from said insulating support; a switch bar positioned to contact the resilient portions of said contact members; an arm supporting said switch bar and extending sidewise therefrom; a hinge joint connecting said arm with said housing remote from switch bar positioned to allow said arm and said switch bar to swing downward by gravity when said hinge joint is free and unrestrained; and fusible material normally holding said hinge joint immovable with said switch bar in engagement with said contact members, said fusible material being subject to temperature changes of the water in the tank and having a melting temperature below the boiling temperature of water whereby said hinge member will be released and said switch bar moved by gravity to break the circuit across said terminals and disconnect said electric water heater before the water in said tank begins to boil.

DIRK EISINGA.